United States Patent [19]

Gamble

[11] 4,164,671
[45] Aug. 14, 1979

[54] RESISTOR-CONTAINING CRYOGENIC CURRENT LEAD

[75] Inventor: Bruce B. Gamble, Clifton Park, N.Y.

[73] Assignee: General Electric Company, Schenectady, N.Y.

[21] Appl. No.: 908,535

[22] Filed: May 22, 1978

[51] Int. Cl.² ............................................. H02K 9/00
[52] U.S. Cl. ...................................... 310/52; 310/64; 310/72
[58] Field of Search .................... 310/10, 40, 52, 54, 310/64, 72, 264, 198; 174/15 S; 62/50

[56] References Cited

U.S. PATENT DOCUMENTS

| 4,082,967 | 4/1978 | Laskaris | 310/64 |
| 4,091,298 | 5/1978 | Gamble | 310/198 |
| 4,123,677 | 10/1978 | Laskaris et al. | 310/64 |
| 4,126,798 | 11/1978 | Carr et al. | 310/72 |

*Primary Examiner*—R. Skudy
*Attorney, Agent, or Firm*—Richard G. Jackson; Joseph T. Cohen; Leo I. MaLossi

[57] ABSTRACT

Resistors disposed for vaporizing vapor-trap liquid coolant are individually connected in series with each of the high-aspect-ratio current leads connected to a superconductive coil of an intermittently operable electromagnetic machine. The portion of each lead extending from a coolant vapor return duct (through which the leads enter the machine) and terminating within the coil chamber is of hollow structure. The terminal length of each such portion is turned radially outward and its open outer end is submerged in the pool of liquid coolant in the chamber. The vapor traps are individually defined by liquid coolant in the hollow terminal length of each lead. Coolant vaporized in each trap flows in lead-cooling relationship with the corresponding hollow lead portion. The high-aspect-ratio leads reduce the heat conducted by the leads during current-off periods, while each resistor produces sufficiently large vapor flow during current-on periods to accommodate the increased cooling load developed by these leads during the latter periods. Intermittent operation can be accommodated with minimal coolant consumption.

11 Claims, 3 Drawing Figures

RESISTOR-CONTAINING CRYOGENIC CURRENT LEAD

BACKGROUND OF THE INVENTION

The Government has rights in the herein claimed invention pursuant to Contract No. F33615-76-C-2167 awarded by the U.S. Air Force.

This invention relates to improvements both in superconducting rotors and in methods of operating such rotors, and more particularly to improved leads electrically connecting a superconducting coil at cryogenic temperatures to a current distribution device (e.g., slip rings, brushes) at higher temperatures (e.g., normal room or ambient temperatures).

Inherently, such leads have a high thermal conductivity and represent a major source of heat leakage into the cryogenic portion of the machine and they must be effectively cooled so as to minimize this heat leakage. My copending U.S. patent application Ser. No. 641,836, filed Dec. 18, 1975, now U.S. Pat. No. 4,091,298, describes an improved means and process wherein coolant vaporized in a vapor trap may be conducted along the leads through hollow cores thereof to minimize such heat leakage.

Superconductive rotors and the leads associated therewith according to the prior art are summarized in my referenced patent application, for example at page 12, lines 1-12 thereof. That application, which is assigned to the assignee hereof, is incorporated herein by reference. The invention described therein is a substantial advance in the art, with applicability to such rotors employing leads within a wide range of LAR's (lead aspect ratios). LAR of a lead is the ratio of its length to its transverse area.

However, there is room for further improvement of such rotors, particularly when included in electromagnetic machines adapted for, or employed in, intermittent operations. In a variety of commercially important applications, e.g., pulsed power supply generators, the superconducting coil or rotor winding is excited intermittently and often for only a small fraction of the time, that is the excited or current-on period is less than the current-off period. The heat conducted to the superconducting coil by the leads during current off-periods is the dominant heat load giving rise to cryogen consumption in applications where such periods are a large fraction (e.g., 60% or more) of the combined current-off and current-on periods. During current-off periods it would be desirable for the leads to be of high aspect ratio since during such periods the heat conducted or leaked via the leads into the cryogenic portion of the machine and associated cryogen usage would thereby be reduced. However, leads having high aspect ratios are easily overheated (e.g., to failure thereof) by the excessive heat resistively generated therein during current-on periods in the absence of well-controlled cooling in an amount effective for accommodating the excessive heat.

The present invention provides a solution to this problem, thereby permitting inclusion of leads of high aspect ratio and effectively minimizing time-averaged cryogen consumption and risk of lead failure.

DESCRIPTION OF THE INVENTION

Generally stated, the present invention provides in one aspect thereof, an improved superconducting rotor. In such aspect, this invention provides, in a rotor of the above-described type, an improvement wherein the rotor is adapted for highly effective intermittent operation. The improvement comprises using high-aspect-ratio current leads electrically connected to the coil or rotor windings for carrying current between the windings at cryogenic temperatures and a current distribution device at higher temperatures (e.g., room temperature). Resistance means (e.g., resistors) are disposed for vaporizing vapor-trap liquid coolant and are individually connected in series with each of the high-aspect-ratio current leads. The portion of each lead extending from a coolant vapor exit port or return duct (through which the leads enter the main body of the machine) and terminating within the coil chamber is of hollow structure. The terminal length of each such portion is turned radially outward and the open outer end thereof is disposed below the surface of the pool of liquid coolant in the chamber. The vapor traps are individually defined by liquid coolant in the hollow terminal length of each lead. Coolant vaporized in each trap flows in lead-cooling relationship with the corresponding hollow lead portion to remove heat therefrom. The high-aspect-ratio leads reduce the heat conducted by the leads during current-off periods. Each resistor controllably produces sufficiently large vaporized coolant flow during current-on periods to accommodate the increased cooling load associated with the heat resistively generated by these leads during the latter periods. Intermittent operation can be accommodated with minimal coolant consumption in the improved rotor.

BRIEF DESCRIPTION OF THE DRAWING

The present invention will be better understood by referring to the following detailed description taken with the accompanying drawing, which illustrates the best mode contemplated for carrying out the invention.

In the drawing.

DETAILED DESCRIPTION OF THE INVENTION AND MANNER AND PROCESS OF MAKING AND USING IT

Figure 1:
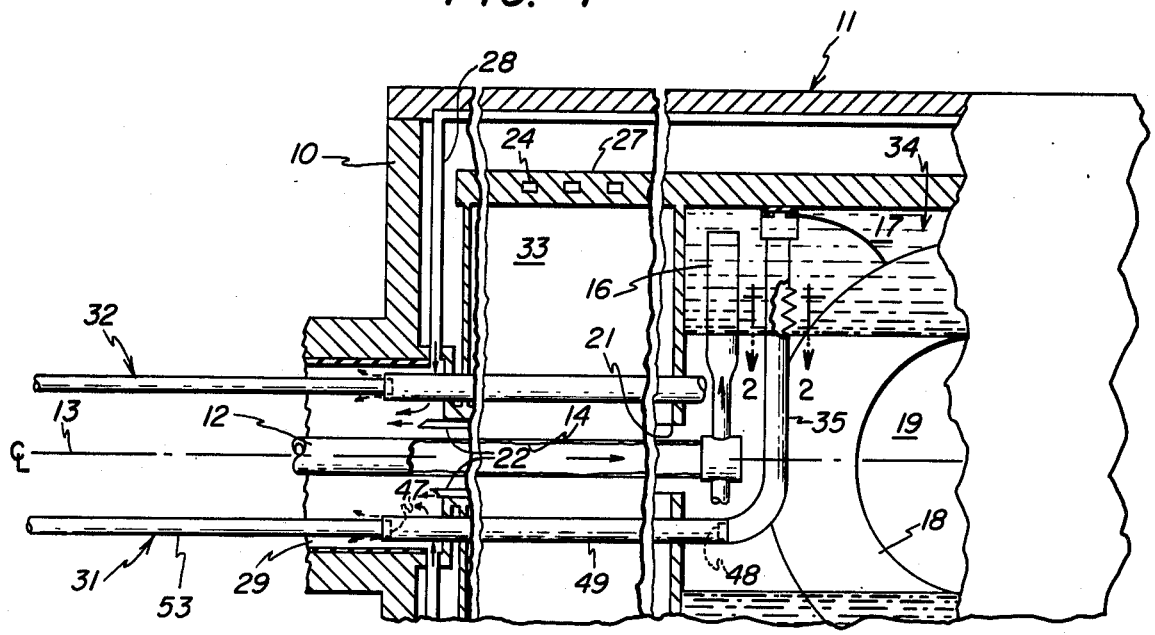
FIG. 1 is a fragmentary longitudinal view, partly in section, illustrating a portion of a superconductive A.C. generator rotor embodying the present invention.

The collector (non-driven) end 10 of a superconducting rotor 11 for an A.C. machine adapted for intermittent operation with minimal coolant or cryogen usage is shown in FIG. 1. Cryogenic refrigerant in the form of saturated liquefied coolant, typically helium at 4.2° K., is supplied to the collector end of the rotor through a conduit 12 from a transfer joint or coupling (not shown) in a manner substantially as described in U.S. Pat. Nos. 4,018,059 (Hatch) and 3,991,588 (Laskaris). Both of these patents are incorporated herein by reference.

As conduit 12 rotates axially about longitudinal axis 13 in unison with rotor 11, the coolant in conduit 12 separates centrifugally into a vapor phase core surrounded by a liquid phase film, producing a vapor-liquid interface 14. Conduit 12 is terminated at, and is in flow communication with, refrigerant dispensing means 16 whereby liquid coolant is conducted to the pool 17. The delivery duct employed herein is that disclosed in copending U.S. patent application Ser. No. 573,168—Laskaris et al., filed Apr. 30, 1975, now U.S. Pat. No. 4,123,677, assigned to the assignee of the instant invention and incorporated by reference. The self-regulating transport characteristics of delivery duct 16 regulate the height of the liquid surface in pool 17. Rotor windings 18 are immersed at least in part in pool 17.

Coolant in the vapor phase in rotor 11 may be returned from the central vapor core 19 at the collector end 10 to a refrigerator compressor (not shown) via hub 21 in flow communication therewith. The gaseous coolant flows from hub 21 into a conduit 22 via a system illustrated by conduit loops 24 (as described more fully in my above-referenced application), thereby cooling a portion of torque tube 27. Conduit 22 conducts this coolant vapor to the transfer joint from which it may be discharged to the compressor for reliquefaction. Similarly, coolant in the vapor phase is returned from the driven end (not shown) of rotor 11 via conduit 28 in flow communication with central core 19 at the driven end. The gaseous coolant return flow from conduit 28 enters annular space 29 and may also be returned for reliquefaction. In some applications, e.g., pulsed power supply generators on board aircraft (or other vehicles) where weight considerations preclude having a compressor on board, the returned vapor phase coolant is either discharged to the environment or collected for subsequent reliquefaction. In either instance, the need increases for minimal time-averaged cryogen usage or consumption, e.g., such usage averaged over the duration of an aircraft flight or mission, whereby less cryogen can be carried.

Materials for construction of the structural components of the device must be compatible with the mechanical and thermal stress constraints imposed. Thus, in the cryogenic system various stainless steels, for example, meet these criteria.

The system should be capable of performing properly at different mass flow rates of liquid coolant and coolant flow should be controlled accurately such that the minimum required flow is supplied. To increase efficiency, vapor supplied with the liquid, or released from it through any transport process, is utilized for cooling various portions of the rotor including the current leads. In the absence of the resistance provided by this invention, for a given operating current an optimum or maximum LAR exists that yields a minimum steady-state coolant demand without overheating.

Current leads 31, 32 carry current between slip rings (not shown) at room temperature and the rotor windings 18. The construction of leads 31, 32 is preferably identical and, in the interest of clarity, details are provided only with respect to current lead 31. In accordance with this invention, lead 31 is so formed as to have a relatively high LAR, i.e., higher than the maximum LAR described above. In general, such higher LAR can be achieved by using a longer lead, a lead of smaller transverse area or a combination of longer length and smaller transverse area. The higher LAR may be, for example, from about 10% (or less) up to about 100% (or more) greater than, and preferably at least about 25% greater than, the "maximum" or steady-state LAR of a lead of the same material and otherwise identical construction. As indicated above, such high-LAR leads reduce the heat load and resulting amount of cryogen usage necessary for adequate cooling during current-off periods, i.e., periods when current is not carried, e.g., by lead 31. The increased amount of heat resistively generated in the high-LAR lead 31 is accommodated in a manner described in more detail below by the provision of resistor 50 in an appropriate location in lead terminal length 35 and connected therewith in electrical series.

The current lead structures in the rotor construction shown enter along annular duct 29, which also serves to withdraw a coolant vapor flow from the rotor, e.g., for reliquefaction thereof. Since these lead structures 31, 32 are located off centerline 13, they are subjected to centrifugal loading and supports (not shown) should be supplied therefor at intervals. Preferably, the construction of each lead structure changes serially therealong (as described in the referenced application Ser. No. 641,836, now U.S. Pat. No. 4,091,298) as the lead extends from duct 29 through vacuum chamber 33 to terminate within rotor winding chamber 34. The lead 31 turns within the chamber from the axial direction to proceed in the generally radial direction toward the torque tube 27 extending into pool 17.

Figure 2:
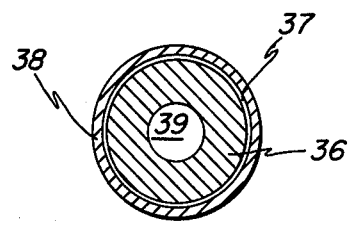
FIG. 2 is a partial sectional view, taken on line 2—2 of FIG. 1, illustrating preferred construction of the terminal length of the current lead.
Figure 3:
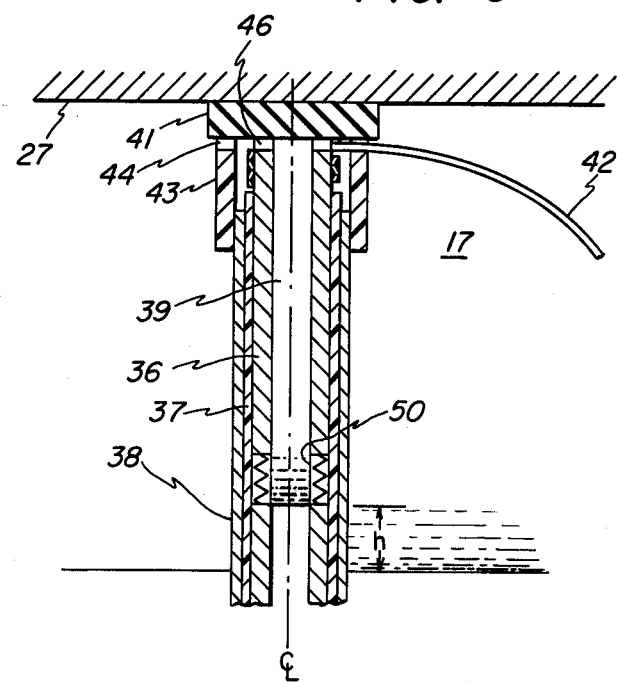
FIG. 3 is a detailed schematic view, in section, showing the outer open end of the terminal length, the vapor trap, the resistor associated therewith, and the difference in liquid levels obtaining during rotation of the machine.

As shown in FIGS. 2 and 3, terminal length 35 of lead 31 comprises hollow electrically conductive rod 36, thermal insulating sheath 37 and outer metal cover 38. The rod is preferably of copper, with OFHC (oxygen-free high conductivity) copper being especially preferred. Preferably, sheath 37 is of polytetrafluoroethylene (PTFE) or other plastic able to provide an effective thermal barrier (as well as electrical insulation) in order that the lead will transfer a substantial amount of the heat conducted therealong and generated therein to the liquid within hollow core 39. Cover 38 is preferably of stainless steel, but other metals and alloys may be used. Although copper is preferred as the electrically conductive material for carrying current in the lead structures, other metals such as aluminum, brass or stainless steel may be used.

As shown in FIG. 3, the distal end of rod 36 is spaced from torque tube 27 by insulating (thermal and electrical) block 41. As shown, a bare length of rod 36 protrudes from sheath 37 and cover 38 and accommodates superconductor lead 42 wrapped therearound and soldered or brazed thereto. Lead 42 electrically interconnects lead 31 with superconductor windings 18. The bare length of copper is covered by plastic sleeve 43, several slots or grooves 44 being provided therein to permit the unencumbered passage of liquid coolant therethrough and to accommodate the disposition of lead 42. Similar slots, or grooves, 46 permit liquid coolant to freely enter core 39 as required.

During rotation of rotor 11 the level of the pool liquid and the level of the liquid in the core 39 differ by a distance h. This results from the pressure in the vapor trap radially inward of the liquid in core 39 being greater than the pressure in vapor core 19.

Resistor 50 is disposed within lead portion 35 in electrical series therewith and in heat-exchange relationship with the liquid coolant received in core 39. (The so received liquid coolant is referred to herein as vapor-trap liquid coolant.) As shown, such relationship preferably is direct resistor-to-liquid contact. The resistor may be located, for example, in any suitable location between the level of liquid coolant in the vapor trap and the radially outer end of core 39, and preferably proximate the surface of the vapor-trap liquid coolant (as shown). The connection of the resistor to the lead may be, e.g., a soldered or brazed connection.

The resistor is preferably formed with the transverse annular area thereof being of substantially the same size and shape as the annular transverse area of the remainder of hollow terminal length 35 of lead 31. In this preferred construction, the resistor is formed of an electrically conductive material having a higher electrical resistivity than that of the material of which the remainder of the terminal length is formed. A preferred combination is an annular terminal length of OFHC copper with an annular resistor of "commercial bronze" (90% copper, balance principally tin) having resistivities (at 4.2° K.) of about 0.016 and about 2.11 micro-ohm-centimeters, respectively.

In operation, heat from the resistor-containing lead structure vaporizes liquid coolant in contact with the lead structure, primarily within core 39. During current-on periods, heat is resistively generated in the resistor 50 (by the current carried therethrough) at a rate which is higher for higher values of the electrical resistance thereof. Heat resistively generated in the resistor is the principal source of heat for vaporizing the vapor-trap liquid coolant in the improved rotor and process of this invention. Substantially all the generated vapor is trapped by the liquid in core 39 and flows via the vapor-conducting means (e.g., the core of hollow lead portion 35 and the vapor passages of lead portion 49) into duct 29, as described in Ser. No. 641,836, now U.S. Pat. No. 4,091,298 (referenced above), cooling the lead structure during transit.

As indicated above, in the absence of effective cooling the high-LAR leads employed herein could easily fail from overheating due to the increased heat resistively generated therein during current-on periods.

The electrical resistance value of resistor 50 preferably is sufficient to vaporize the vapor-trap liquid coolant at a sufficient rate such that the resulting vapor flow prevents thermal failure of the high-LAR lead 31. The requisite resistance value increases with increasing LAR of the lead. In general, the resistance value, R, should be at least about 0.00479 times the LAR value of the lead (exclusive of the resistor), where the R and LAR values are expressed in micro-ohm and $cm^{-1}$ units, respectively.

Unless otherwise indicated herein, the lead LAR referred to herein is the overall LAR thereof exclusive of the resistor. Where various lead portions (e.g., portions 35, 49, and 53) have different individual LAR values, the overall LAR value is the arithmetic sum of the individual LAR values.

In general, a suitable lead LAR value is $1.75 \times 10^5$ $cm^{-1}$ per one amp of current. Thus, in a preferred embodiment wherein the lead is formed of OFHC copper and adapted to carry a current of up to 1000 amps, the relatively high LAR value is 175 $cm^{-1}$ and the R value of the resistance means (e.g., resistor 50) is at least about 0.838 micro-ohm.

The coolant demand of the vapor-cooled lead is highly responsive to changes in current. As heat reaches the liquid in core 39 and liquid in the core is vaporized, the vaporized liquid is replaced in core 39 due to the rotational velocity and the coolant vapor proceeds to cool the lead structure. Thus, a self-correcting system is provided, which automatically provides correlation between the heat in (via the lead structure) and the coolant vapor flow generated to cool the lead structure. Although there is no known upper limit on the LAR value of the relatively high-LAR leads included herein, for applications where sudden large increases in current may occur the LAR value should not be so high as to unduly delay effectuation of the resulting (and self-correcting) increase in vapor flow.

Additional desirable or preferred structural features (and descriptions of operation) of the improved rotor, which are not essential to an understanding of the novel features of this invention, are set forth in Ser. No. 641,836. Reference is made to FIG. 1 thereof for a more detailed illustration of annular space 29, chamber 33 and the associated portions of vapor conduit 22 and the conduit system placing hub 21 in flow communication therewith. Also the preferred transverse structure of lead portion 49 (and associated insulation) hereof is as illustrated and described therein, respectively at its FIG. 2B and text from page 8, line 23 to page 9, line 12. At juncture 47 between lead portions 49 and 53 provision is made for the coolant vapor to leave the vapor-flow volume within the lead structure and enter duct 29 to combine with the other coolant vapor flow therein. The preferred construction for the lead to the left of juncture 47 is solid uncovered copper bar stock.

BEST MODE CONTEMPLATED

The best mode contemplated for carrying out this invention has been set forth in the description above, for example by way of setting forth the preferred construction of the leads and resistance means, the preferences indicated for materials to be used, and preferred LAR and resistance values.

What is claimed is:

1. In a superconducting rotor comprising means connected to said rotor for rotation thereof, means in flow communication with the rotor winding chamber of said rotor for supplying liquefied gas thereto as coolant for maintaining rotor windings disposed therein submerged at least in part in a pool of liquefied gas and at cryogenic temperatures, means in flow communication with said chamber for withdrawing coolant vapor therefrom, and means electrically connected to said rotor windings for carrying current between a current distribution device at room temperature and said rotor windings at cryogenic temperatures, the improvement for adapting said rotor for intermittent operation with minimal coolant usage, wherein:

(a) a portion of each current-carrying means includes means open at both ends for conducting a confined flow of coolant vapor along and in contact with said current-carrying means, (b) said vapor-conducting means being in flow communication at one open end thereof with a part of said vapor-withdrawing means, (c) said portion having a terminal length thereof extending into said rotor winding chamber, (d) said terminal length being disposed in the generally radial direction locating the other open end of said vapor-conducting means adjacent the wall of said rotor winding chamber, (e) said other open end being submerged below the surface of said pool of liquefied gas during operation to enable liquefied gas to freely enter therein, (f) each current-carrying means includes a current lead having a relatively high lead aspect ratio, and (g) each current lead is provided with resistance means connected in electrical series therewith having relatively high electrical resistance for vaporizing liquefied gas, each resistance means being disposed between the level of liquefied gas within said terminal length and the other open end thereof and in heat exchange relationship with the liquefied gas within said length.

2. The improvement of claim 1 wherein said lead aspect ratio is greater than that aspect ratio corresponding to the minimum steady-state coolant demand of a lead of the same material and construction in the absence of said resistance means.

3. The improvement of claim 1 wherein each lead is adapted to carry a current of up to 1000 amps and the value of the lead aspect ratio of each lead is at least 175 cm$^{-1}$.

4. The improvement of claim 3 wherein the resistance value of each resistance means is at least 0.838 micro-ohm.

5. The improvement of claim 1 wherein the resistance value of the resistance means provided for each lead is sufficient to vaporize the liquid coolant in heat exchange relationship with said resistance means at a sufficient rate such that the resulting vapor flow along said portion prevents thermal failure of said lead.

6. The improvement of claim 5 wherein said resistance value (R) is at least about 0.00479 times the value of the aspect ratio (LAR) of the lead (exclusive of the resistance means, where the R and LAR values are expressed in micro-ohm and cm$^{-1}$ units, respectively.

7. The improvement of claim 1 wherein the resistance means is formed with the transverse area thereof being of substantially the same size and shape as the transverse area of said terminal length, said resistance means being of an electrically conductive material having a higher electrical resistivity than that of the material of which said terminal length is formed.

8. A pulsed power supply generator including the improved rotor of claim 1.

9. An aircraft including the generator of claim 8.

10. In the method of operating a super-conducting rotor driven within a stator assembly wherein liquefied gas is supplied to the rotor winding chamber as the coolant for maintaining the rotor windings at cryogenic temperatures, coolant vapor is withdrawn from said rotor winding chamber and current is carried to and from said rotor windings through current-carrying means, the improvement comprising:

employing a current lead having a relatively high lead aspect ratio as at least a portion of said current-carrying means, defining a thermally insulated volume in contact with surface area of each current-carrying means employed along a length thereof, a terminal portion of said volume being positioned in said rotor winding chamber in a location subject to significant centrifugal forces during rotor rotation, said terminal portion of said volume being defined in part by a surface of liquefied gas, said current lead being provided with resistance means having relatively high electrical resistance for vaporizing liquefied gas in heat exchange relationship therewith, said resistance means being connected in electrical series with said lead and disposed below said liquefied gas surface, transferring heat from said resistance means to the liquefied gas in heat exchange relationship therewith and automatically replacing such liquefied gas as it is converted to the vapor phase, said vapor phase being displaced along said thermally insulated volume into a second volume transporting coolant vapor being withdrawn from said rotor winding chamber, said relatively high lead aspect ratio being greater than that aspect ratio corresponding to the minimum steady-state coolant demand of a lead of the same material and construction in the absence of said resistance means, the electrical resistance value of said resistance means being sufficient to vaporize said liquefied gas in heat exchange relationship therewith at a sufficient rate such that the resulting vapor flow substantially prevents thermal failure of said current lead.

11. The improvement of claim 2 wherein said lead aspect ratio is at least 25% greater than said corresponding aspect ratio.

* * * * *